(No Model.) 2 Sheets—Sheet 1.
C. T. HOLMAN.
HORSE HAY RAKE.
No. 292,013. Patented Jan. 15, 1884.
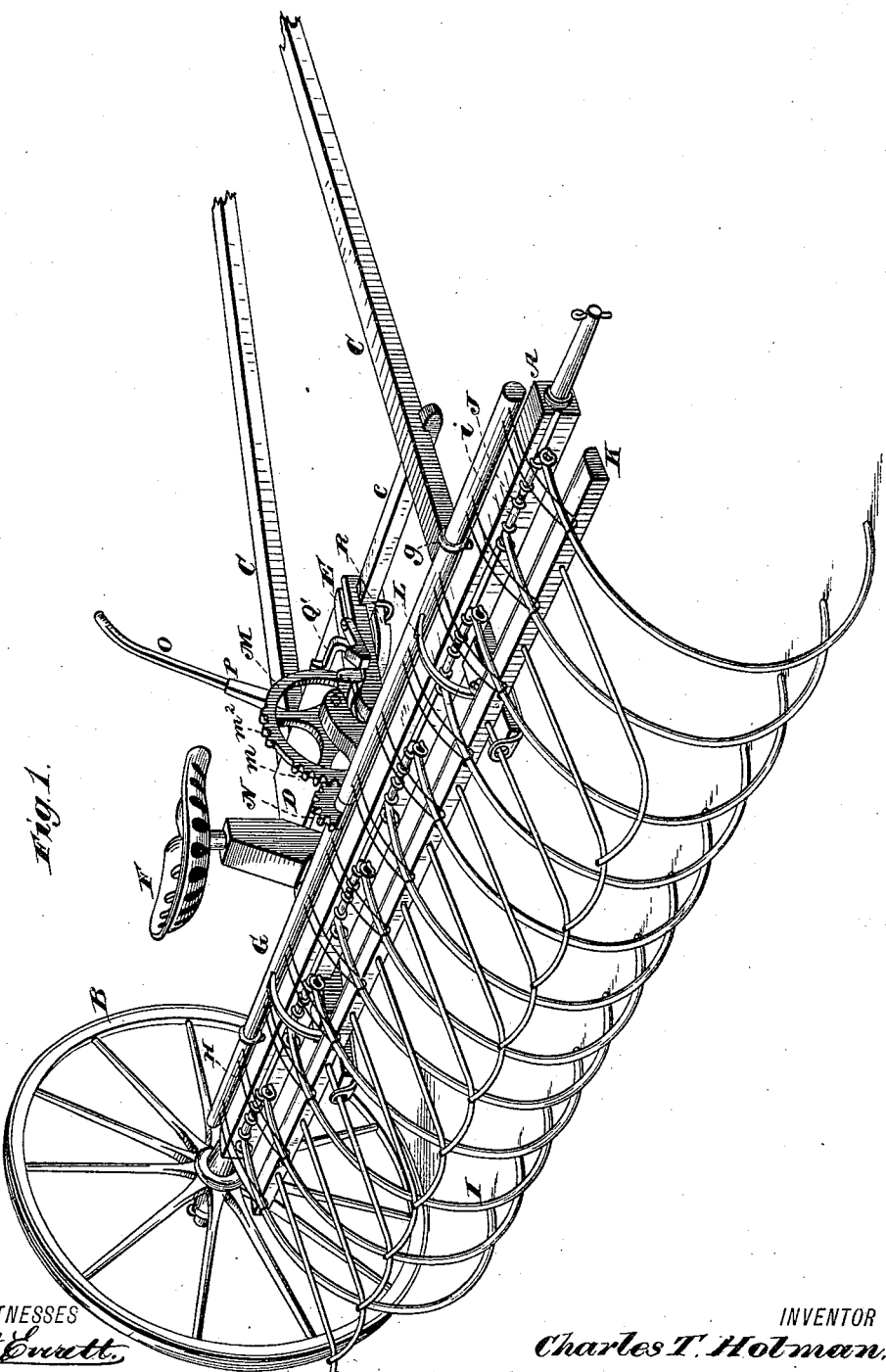
WITNESSES
Robt Everitt
J. A. Rutherford
INVENTOR
Charles T. Holman,
By James L. Norris.
Attorney
N. PETERS, Photo-Lithographer, Washington, D. C.

(No Model.) 2 Sheets—Sheet 2.
C. T. HOLMAN.
HORSE HAY RAKE.
No. 292,013. Patented Jan. 15, 1884.
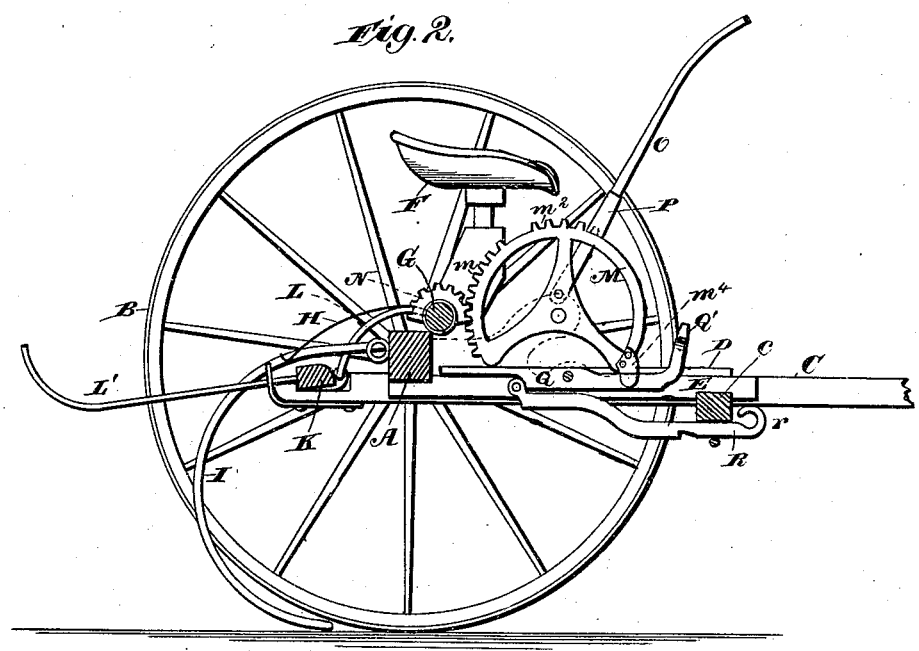
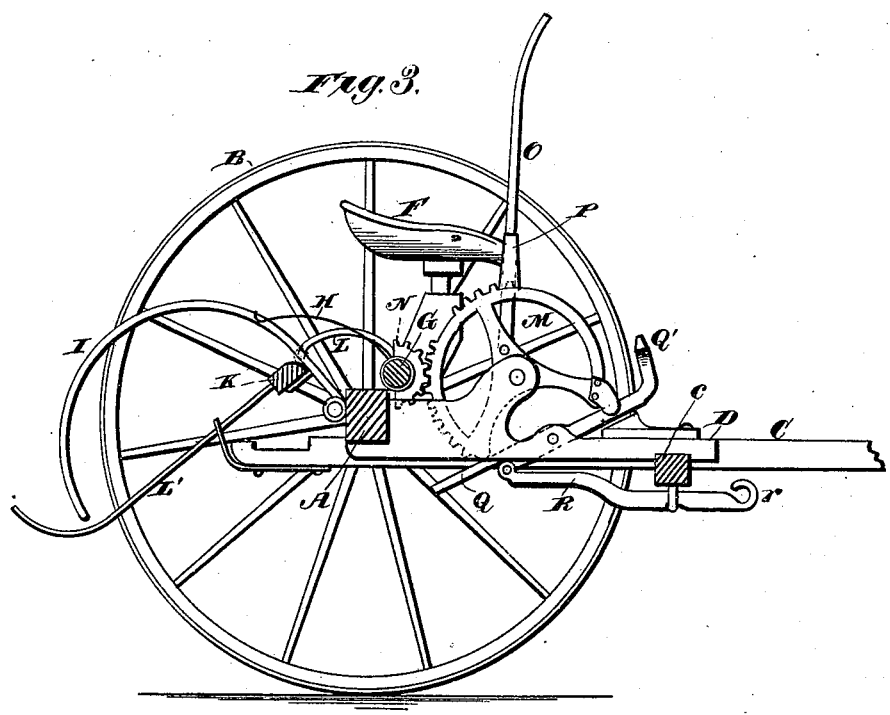
WITNESSES
Robert Emmett,
J. A. Rutherford
INVENTOR
Charles T. Holman,
By James L. Norris
Attorney

UNITED STATES PATENT OFFICE.

CHARLES T. HOLMAN, OF LINESVILLE, PENNSYLVANIA, ASSIGNOR OF ONE-HALF TO ALEXIS C. CARPENTER, OF ROCHESTER, NEW YORK.

HORSE HAY-RAKE.

SPECIFICATION forming part of Letters Patent No. 292,013, dated January 15, 1884.

Application filed June 15, 1883. (No model.)

*To all whom it may concern:*

Be it known that I, CHARLES T. HOLMAN, a citizen of the United States, residing at Linesville, Crawford county, Pennsylvania, have invented new and useful Improvements in Horse-Rakes, of which the following is a specification.

The present invention relates to that class of horse hay-rakes in which a series of curved teeth trailing behind a wheeled frame are raised to drop a windrow or load of collected hay by means of the draft animals, stripping fingers being used for clearing the hay from the rake-teeth.

The object of the invention is to provide simple and effective mechanism for operating the rake-teeth and clearer-fingers by means of the draft force and devices under the control of the driver, these devices being so arranged that the teeth are held in position for collecting the hay by foot-pressure, and raised to discharge the load by means of a sliding bar connected with the draft-bar.

The invention will first be fully described and then set forth in the claims.

In the drawings, Figure 1 is a perspective view of a horse hay-rake, embracing my improvements, the parts being in position for collecting the load. Fig. 2 is a vertical section of the same. Fig. 3 is a vertical section, representing the rake-teeth raised and clearers lowered to discharge the load, showing the relative positions of the rake-operating devices.

The letter A designates the axle of the rake, which has end journals or spindles for the reception of ground or transporting wheels B. To the under side of the axle are attached thills or shafts C, which have a suitable cross-bar, c, and a foot-board, D. A slotted longitudinal bar, E, is secured to said cross-bar c and the center of the axle A; or two bars may be arranged so as to form a longitudinal space between the same.

The driver's seat F is arranged at one side of the center of the rake, and is mounted on a standard, F, extending from the axle. On the top of the latter is located a transverse bar or shaft, G, which is of the same length as the axle, minus the spindle-arms thereof, and is fitted in eyes or hook-shaped staples g, fastened to the axle. These staples form bearings in which the bar G can rock or turn, for the object hereinafter stated. Rearwardly-extending springs H, made preferably of wire rods, or, if desired, of metallic plates, are let into or secured to said bar G, and bear upon the curved rake teeth I, that are pivoted at their upper ends to the rear side of the axle A. These teeth are of the customary curved shape, except that the upper ends of each adjoining pair of teeth are respectively provided with arms i, turned to the right and left or at right angles to the teeth I, these arms being fitted in eyes or bearings J, applied to the rear side of the axle. In other words, horizontal pivot arms or pintles are formed on the upper portions of the rake-teeth, the pivots of a pair of adjoining teeth being turned in opposite directions, so that their ends will meet, as is clearly shown in Fig. 1. A bearing-bar, K, is loosely suspended from rigid arms L, extending from the rock-shaft G, this bar being arranged under the teeth and serving to support the entire series thereof. The bar K carries clearer-fingers L', which extend in a rearward direction therefrom, and have upwardly-turned ends, so that they will easily glide over the hay or dumped load and not penetrate the same. The upper side of the bar K is made sufficiently flat and broad so that it will serve as a support for the teeth when the same are in their normal or working positions. (Indicated in Figs. 1 and 2.) The front edge of the bar K, however, is rounded or beveled, so that when the rock-shaft G is turned the pivotal connection between the arms L thereof, and the bar K will cause the latter to turn on said arms L and assume a vertical position, as is shown in Fig. 3. As the bar K passes into the position last referred to, it serves to raise the rake-teeth and depress the clearer-fingers L, the latter tending in their downward movement to strip the hay from the ascending rake-teeth, so that the entire collected load or windrow of grain will be deposited upon the ground.

The mechanism for holding the rake-teeth in their working position, and elevating the same when a load has been collected, may be described as follows: A semicircular disk or plate, M, made either solid or of a skeleton form, is journaled in a horn-shaped extension of the longitudinal bar E, so that it can rock or turn. The periphery of this disk or plate has at the portion thereof adjoining the rock-shaft G a series of teeth, $m$, which mesh into a spur-sector, N, on the center of the rock-shaft. The upper portion of the periphery of the disk M has an additional series of teeth, $m^2$, which serve to hold a hand-lever, O, at different angles in relation to said disk. This lever is fulcrumed at its lower end upon the pivot or axis of the disk M, so that it can be moved back and forth independently of said disk. A clasp or sleeve, P, is fitted on the lever O in such a manner that it can be adjusted thereon, and this clasp serves as a medium for locking the lever to the disk M by entering it between any of the teeth $m^2$. The object of the adjustable lever is to enable different-sized operators or drivers to properly and conveniently operate the rake-dumping devices, it being understood that the lever is moved back and forth on the disk M to suit the exigencies of the case. A horizontal lever, Q, is pivoted between the bars E or in the slot of a single bar, the pivot-point being located at the center of said lever. The front portion of the lever Q is turned in an upward and horizontal direction, and forms a treadle, Q′, or arm adapted to receive the foot of the driver. To the under side of the lever Q, in rear of its fulcrum-point, is pivoted a sliding draft bar or arm, R, which moves in a suitable guide or keeper on the cross-bar of the thills, and has a hook, $r$, at its front end. This hook receives the whiffletree or the device to which the draft-animal is hitched. At the front lower end of the disk M are located two flanges or ears, $m^4$, which embrace the portion of the lever Q in immediate proximity to the treadle Q′ thereof.

It will be understood that when the various devices are in the respective positions shown in Fig. 1, the foot of the driver is upon the treadle Q′, so as to hold the rake in a working position by foot-pressure, assisted by a forward pressure applied to the hand-lever O. When it is desired to raise and dump the load, the foot of the driver is removed from the treadle Q′, whereupon the pull of the draft-animal will draw the bar R forward and effect the vibration of the disk M, through the intervention of the lever R, assisted, if necessary, by a rearward pull upon the lever O. This being the result, it follows that the rake-teeth on the disk M will engage with the sector on the rock-shaft and raise the teeth in the manner already referred to, so as to drop the load by its own weight and the action of the clearer-fingers.

Having thus described my invention, what I claim is—

1. In a horse hay-rake, the combination of a rock-shaft having spring-presses and rigid arms, the teeth supporting and elevating bar having clearer-fingers, and pivoted to said rigid arms with the wheeled frame or axle, and the curved rake-teeth pivoted thereto, substantially as described.

2. In a horse hay-rake, the combination of a sliding draft-bar, a centrally-pivoted lever having a treadle at its front end, and connected with the draft-bar, the oscillating disk engaging with said lever, and the hand-lever applied to the oscillating disk, with the wheeled axle, the pivoted rake-teeth, and suitable devices for raising the rake-teeth connected with or actuated by the aforesaid devices, substantially as described.

In testimony whereof I have hereunto set my hand in the presence of two subscribing witnesses.

CHARLES T. HOLMAN.

Witnesses:
WILLIAM A. BOWMAN,
JAMES N. WALKER.